United States Patent
Ishiwari et al.

(10) Patent No.: US 6,899,932 B1
(45) Date of Patent: May 31, 2005

(54) POLYTETRAFLUOROETHYLENE MOLDED PRODUCT IN BLOCK FORM AND METHOD FOR PRODUCTION THEREOF

(75) Inventors: Kazuo Ishiwari, Settsu (JP); Tatsuro Uchida, Settsu (JP); Masahiko Yamada, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/787,303
(22) PCT Filed: Sep. 7, 1999
(86) PCT No.: PCT/JP99/04832
§ 371 (c)(1),
(2), (4) Date: Mar. 16, 2001
(87) PCT Pub. No.: WO00/16968
PCT Pub. Date: Mar. 30, 2000

(30) Foreign Application Priority Data

Sep. 18, 1998 (JP) .......................... 10-264681

(51) Int. Cl.[7] .............................. B29D 23/00
(52) U.S. Cl. .................. 428/36.9; 428/421; 264/108; 264/115; 264/127; 264/331.14
(58) Field of Search ............... 264/127, 108, 264/115, 331.14; 428/421, 36.9

(56) References Cited

U.S. PATENT DOCUMENTS 5,032,335 A 7/1991 Wilson
5,683,639 A * 11/1997 Ebnesajjad et al. ......... 264/127

FOREIGN PATENT DOCUMENTS

| DE | 1504174 | 8/1969 |
| DE | 1704281 | 5/1971 |
| EP | 0 970 799 A1 | 1/2000 |
| GB | 1027712 | 6/1966 |
| JP | 3197122 | 8/1991 |
| JP | 4185426 | 7/1992 |
| JP | 6262693 | 9/1994 |
| JP | 06015663 | 1/1997 |

* cited by examiner

Primary Examiner—Nasser Ahmad
Assistant Examiner—Jane Rhee
(74) Attorney, Agent, or Firm—Birch, Stewart, Kolasch & Birch, LLP

(57) ABSTRACT

A block-shaped baked molded article having little block deformation amount is obtained in order to reduce a loss of materials until a stable film or sheet can be cut from a block-shaped molded article. After a polytetrafluoroethylene powder is compression-molded to form a preform, the resultant preform is baked while being rotated, thereby to produce a polytetrafluoroethylene molded article.

13 Claims, 4 Drawing Sheets (a)

(b)

(c)

(d)

POLYTETRAFLUOROETHYLENE MOLDED PRODUCT IN BLOCK FORM AND METHOD FOR PRODUCTION THEREOF

This application is the national phase under 35 U.S.C. § 371 of PCT International Application No. PCT/JP99/04832 which has an International filing date of Sep. 7, 1999, which designated the United States of America and was published in English.

FIELD OF INVENTION

The present invention relates to a molded article made of polytetrafluoroethylene (hereinafter also referred to as "PTFE") and a method of producing the same. According to the present invention, a large PTFE molded article block having less distortion and small strain can be produced.

RELATED ART

PTFE has a very high melt viscosity of at least about $10^8$ poise at 380° C. and, therefore, molding methods such as extrusion and injection used for general thermoplastic resins (having a melt viscosity of $10^3$ to $10^4$ poise on molding) can not be applied.

For this reason, as the molding method of PTFE, the following compression molding method is most popular and block-shaped molded articles can be molded by this method.

(a) A mold is filled uniformly with raw material powder, and the mold is compressed by using a press at a pressure of 100 to 1,000 kg/cm² and a normal temperature.

(b) The resultant comparatively brittle cylindrical preform is put into a furnace so that the rotation symmetry axis of the preform is in the gravitational direction; the baking temperature is raised to 360 to 380° C.; and the temperature is maintained in a state in which the preform is not moved, until the baking of the preform is completed (longitudinal baking method).

(c) The furnace temperature is lowered to room temperature as such to give a block-shaped molded article.

However, in the case of processing the block-shaped molded article into a sheet or film, the loss of materials at the cutting time is large when the deformation amount of the block-shaped molded article (excluding the deformation in a height direction) generated at the baking time is large. This loss of materials is conspicuous with respect to the block-shaped molded articles having a low melt viscosity and a large height.

SUMMARY OF INVENTION

An object of the present invention is to produce a block-shaped molded article having little distortion.

The present invention provides a polytetrafluoroethylene block-shaped molded article having a melt viscosity and a block deformation amount contained within a polygonal region surrounded by a straight line A: $x=1.0\times10^9$ (melt viscosity of $1.0\times10^9$ poise), a straight line B: $x=2.5\times10^{10}$ (melt viscosity of $2.5\times10^{10}$ poise), a straight line C1: $y=7.0$ (block deformation amount of 7.0%), a straight line D1: $y=0$ (block deformation amount of 0%), and a straight line E1: $y=-8.7 \log_{10}(x)+91$ in a graph with an x-axis being a common logarithm of a melt viscosity (poise) at 380° C. of the polytetrafluoroethylene block-shaped molded article and a y-axis being a block deformation amount (%) of the molded article.

Further, the present invention provides a method of producing a polytetrafluoroethylene block-shaped molded article, comprising inserting a polytetrafluoroethylene preform into a pipe in a state in which a symmetry axis of the preform is horizontal; placing the pipe on two rolls spaced apart in a horizontal direction; and heating the preform to bake the preform while rotating the pipe and the preform by rotating at least one roll to transmit a rotation of the roll to the pipe, whereby giving the polytetrafluoroethylene block-shaped molded article.

DETAILED DESCRIPTION OF THE INVENTION

Figure 1:
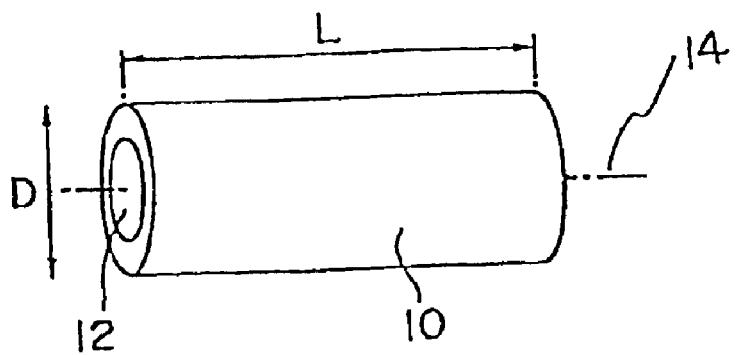
FIG. 1 is a perspective view showing a preform to be used in the present invention.

The polyteirafluoroethylene powder is preferably powder obtained by a suspension polymerization, but may be powder obtained by other polymerization methods (e.g. an emulsion polymerization). The average particle diameter of the polytetrafluoroethylene powder may be from 10 to 1,000 μm.

The polytetrafluoroethylene powder is a homopolymer of tetrafluoroethylene, or a copolymer of tetrafluoroethylene and another fluoromonomer. In the copolymer, a molar ratio of tetrafluoroethylene to the fluoromonomer may be from 95:5 to 99.999:0.001. The copolymer may be a copolymer made of tetrafluoroethylene and perfluorovinylether (i.e. vinylether-modified polytetratluoroethylene). Perfluorovinyl ether may be a compound represented by the formula:

wherein $R_f$ is an organic group, which essentially has a carbon atom and a fluorine atom, and has no hydrogen atom and optionally has an oxygen atom.

The $R_f$ group in the perfluorovinylether (I) may be a perfluoroalkyl group having 1 to 10 carbon atoms, a perfluoro(alkoxyalkyl) group having 4 to 9 carbon atoms, a group represented by the formula (II):

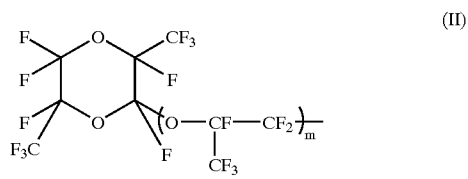

wherein m is a number of 0 to 4, or a group represented by the formula (III):

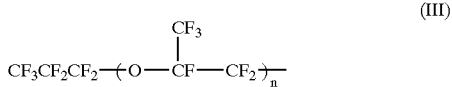
(III)

wherein n is a number of 1 to 4.

The melt viscosity at 380° C. of polytetrafluoroethylene is at most $2.5 \times 10^{10}$ poise, for example, at most $2.0 \times 10^{10}$ poise.

The polytetrafluoroethylene powder is compression-molded to give a preform. In the compression molding, the compression pressure may be generally from 100 to 1000 kg/cm². The period of time for maintaining the compression may be generally from one minute to five hours.

The shape of the resultant preform is not particularly limited, but may be cylindrical. The cylindrical preform may have a hole for passing a rotation shaft at a symmetry axis (rotation symmetry axis) of the cylinder. In the cylindrical preform, the outer diameter (i.e. an outer diameter of the bottom surface perpendicular to the rotation symmetry axis of the cylinder) may be from 10 to 100 cm, and the height of the cylinder (i.e. the length of the cylinder in the axis direction of the rotation symmetry axis) may be from 50 to 300 cm, particularly at least 80 cm.

In the present invention, the "height of the molded article" and the "height of the block" refer to the length of a cylindrical preform or a cylindrical baked block-shaped molded article in the axis direction of the rotation symmetry axis.

The resultant preform is baked while being rotated to give a block-shaped molded article.

In general, the column or cylinder is preferably rotated continuously about a symmetry axis of the column under the state where the column is located so that the symmetry axis of the column is in a horizontal direction. Alternatively, the column is rotated in the direction vertical to the symmetry axis from the state where the column is located so that the symmetry axis of the column is in a vertical direction to provide the state where the column is turned upside down, and then the column may be further rotated to return to the original orientation. In case of rotating the column in the direction vertical to the symmetry axis, the rotation may carry out continuously or intermittently (for example, the column is allowed to stand at the position that the symmetry axis of the column is in a vertical direction for a fixed time (e.g. 1 to 60 minutes)). The rotation speed may be usually from 1 to 300 revolutions/h.

The load applied on the preform per unit area at the time of baking the preform is preferably at most 100 g/cm², for example at most 50 g/cm², particularly at most 30 g/cm². The load per unit area refers to the load applied on the preform per unit area at the time of baking the preform, and is defined by [(weight (g) of the preform)÷(bottom surface area (cm²) of the preform)] in a conventional baking method (longitudinal baking method). In the baking method of the present invention (rotational baking method), the load per unit area is defined by (weight (g) of the preform)÷(surface area (cm²) of the preform facing to the outside, excluding the two bottom surface areas).

Figure 2:
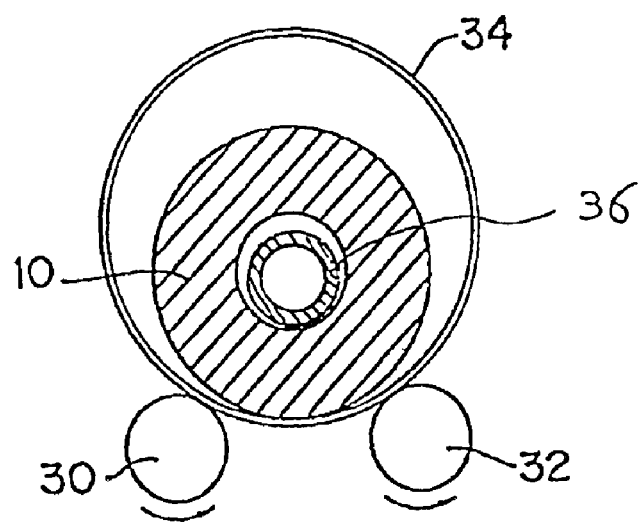
FIG. 2 is a perspective view showing a mode in which the preform is rotated.

At the time of producing a polytetrafluoroethylene block-shaped molded article from the preform, particularly in the case where it is baked by the method of FIG. 2, the block height (i.e. L in FIG. 1) may increase. The increase of the block height may be at least 3%, for example at least 6%, particularly at least 8%.

In the baking, the preform is heated to the temperature which is higher by 10 to 100° C., e.g. by 15 to 50° C. than the melting point of the preform. The heating time is usually from 1 to 500 hours. It is necessary to rotate the preform in the baking, and the rotation is preferably initiated before the temperature of the surface of the preform reaches the temperature which is lower by 100° C. than the melting point of the preform, because the preform begins to deform when it is heated even at a temperature less than the melting point. The rotation is preferably discontinued after the crystallization has been completed by cooling the preform.

A shaft may be inserted through a hole of the preform. The shaft may be made of SUS (stainless steel) or Ni-plated metal (e.g. iron) and may be hollow or solid.

A polytetrafluoroethylene block-shaped molded article is obtained by carrying out the baking. The shape of the polytetrafluoroethylene block-shaped molded article after the baking, is approximately the same as the preform. The molded article expands in the compression direction at the time of preliminary molding, and shrinks in the direction (radial direction) perpendicular to the compression direction.

The present invention provides a polytetrafluoroethylene molded article wherein a loss in weight until a stable film or sheet can be cut (that is, a cut weight of the cut block until a sheet having a width equal to the block height can be obtained) (that is, a block deformation amount):

[(weight of whole molded article)−(weight at minimum outer diameter)]÷(weight of whole molded article)×100 is not more than 0.7% by weight.

Figure 3:
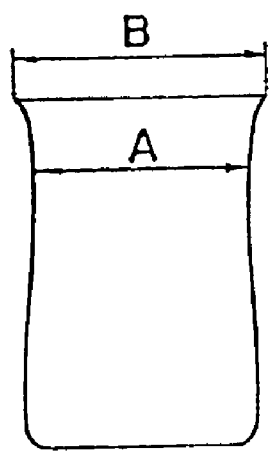
FIG. 3 is a view showing a method of measuring a deformation degree, a roundness, and a bend.
Figure 3:
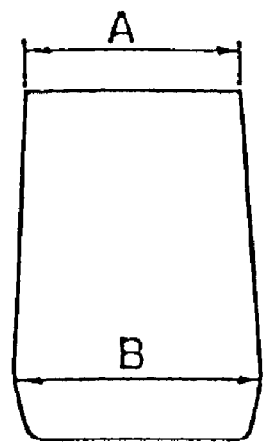
Figure 3:
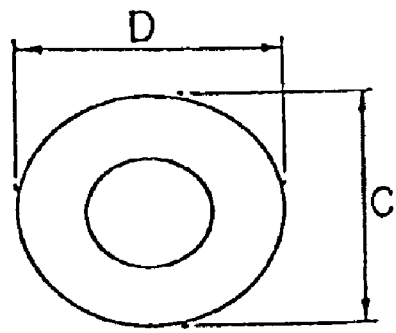
Figure 3:
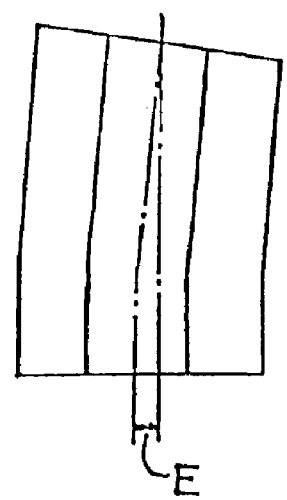

The molded article of the present invention has less deformation. The term "deformation" is used in a molded article whose diameter varies, a molded article whose roundness is not good or a molded article having a bend as shown in FIG. 3. The polytetrafluoroethylene molded article preferably has a roundness degree of not more than 5.0%, for example not more than 3.0%, particularly not more than 0.3%; a deformation degree of not more than 15%, for example not more than 5%, particularly not more than 1.0%; and a bend (based on the height of the molded article) of not more than 2.0%, for example not more than 1.0%, particularly not more than 0.1%.

Roundness degree=(maximum outer diameter (D)−minimum outer diameter (C))÷(minimum outer diameter)×100, Deformation degree=(maximum outer diameter (B)−minimum outer diameter (A))÷(minimum outer diameter)×100, Bend=(difference between a center position of the bottom face of the molded article and a center position of the top face of the molded article (E))÷(height of the molded article)×100.

A film of polytetrafluoroethylene (thickness: e.g. 5 μm to 1 cm, particularly 5 μm to 1 mm) can be obtained by skiving the resulting baked molded article.

A film or sheet cut from the polytetrafluoroethylene molded article according to the present invention has less distortion (in particular curling). A length of film or sheet, which is obtained by cutting the cut film or sheet at 600 mm in the longitudinal direction (the direction of D in FIG. 1) (the longitudinal direction of sheet) and at a width of 50 mm in the height direction (the direction of L in FIG. 1) (the width direction of sheet), is preferably within ±5 mm based on a length of 600 mm at any position of the molded article (that is, comparison among all cut films or sheets).

Even if a film or sheet cut from the molded article obtained by baking is subjected to a heat treatment, the resulting distortion is small (that is, it uniformly expand and shrink). With regard to distortion of a film or sheet obtained by cutting the cut film or sheet into a square having a length of 200 mm in both the longitudinal direction and the height direction, treating at 360° C. for 2 hours, and then cooling at 25° C. per hour, the difference between the maximum length and the minimum length is preferably at most 5 mm in both the longitudinal direction (the direction vertical to the rotation symmetry axis of the molded article) and the height direction (the direction parallel to the rotation symmetry axis of the molded article) at any position of the molded article (that is, comparison among all cut films or sheets).

The resulting polytetrafluoroethylene film or sheet can be used in heat-resistant electric wires, heat-resistant insulating tapes for vehicle motor and generator, anticorrosion linings for chemical plant, piping gasket, and the like.

The present invention will be described in detail with reference to the accompanying drawings.

FIG. 1 is a perspective view illustrating a preform of the present invention. The preform 10 has cylindrical or columnar shape and has a hole 12. The hole 12 is consistent with a symmetry axis of the column. The preform 10 is located so that its symmetry axis is in a horizontal direction. The preform 10 has a diameter (average diameter) D and a length (average length) L as shown in the drawing. Usually, the diameter D is from 20 to 150 cm, for example from 30 to 70 cm, and the length L is from 30 to 300 cm, for example from 60 to 150 cm. The hole diameter is smaller by, for example, from 5 to 100 cm than D. The preform 10 has approximately the same shape and size as those of a molded article after baking. The preform 10 has a symmetry axis (namely, center axis or rotation symmetry axis) 14, which is along the center of the hole 12. The preform 10 is rotated about the symmetry axis 14.

FIG. 2 is a cross-sectional view illustrating an embodiment wherein the preform is rotated. A metal pipe 34 (e.g. an SUS pipe) exists in the outer side of the preform 10. Two rolls 30 and 32 are rotated in the direction of the arrow. The rotation of the rolls 30 and 32 is transmitted to the pipe 34, thereby to rotate the preform 10. A hollow unfixed pipe 36 (particularly a metal pipe) is inserted through the hole of the preform 10, and the rotation of the preform 10 is transmitted to the pipe 36 to rotate the pipe 36. The pipe 36 may be omitted. According to this embodiment, the effect that the preform 10 contacts with the metal pipe 34 in a wider area can be obtained.

FIG. 3 is a diagram illustrating methods of measuring a deformation degree, a roundness degree and a bend (based on the height of the molded article) of the molded article.

FIGS. 3(a) and (b) are elevational views of the polytetrafluoroethylene molded article illustrating a method of measuring the deformation degree. The deformation degree can be determined from the following equation:

Deformation degree=(maximum outer diameter ($B$)−minimum outer diameter ($A$))÷(minimum outer diameter ($A$))×100.

The deformation degree is preferably not more than 15%.

FIG. 3(c) is a top view of the polytetrafluoroethylene molded article illustrating a method of measuring the roundness degree. The roundness degree can be determined from the following equation: (wherein the roundness degree was measured at a position having the largest difference between the maximum outer diameter (D) and the minimum outer diameter (C) on the concentric circles of the molded article.)

Roundness degree=(maximum outer diameter ($D$)−minimum outer diameter ($C$))÷(minimum outer diameter)×100

The roundness degree is preferably not more than 5.0%.

FIG. 3(d) is a cross-sectional view, parallel to the extension direction of the hole, of the polytetrafluoroethylene molded article illustrating a method of measuring the bend in the height of the molded article. The bend can be determined from the following equation:

Bend=(difference between a center position of the bottom of the molded article and a center position of the top face of the molded article ($E$))÷(height of the molded article)×100.

The bend (based on the height of the molded article) is preferably not more than 2.0%.

Figure 4:
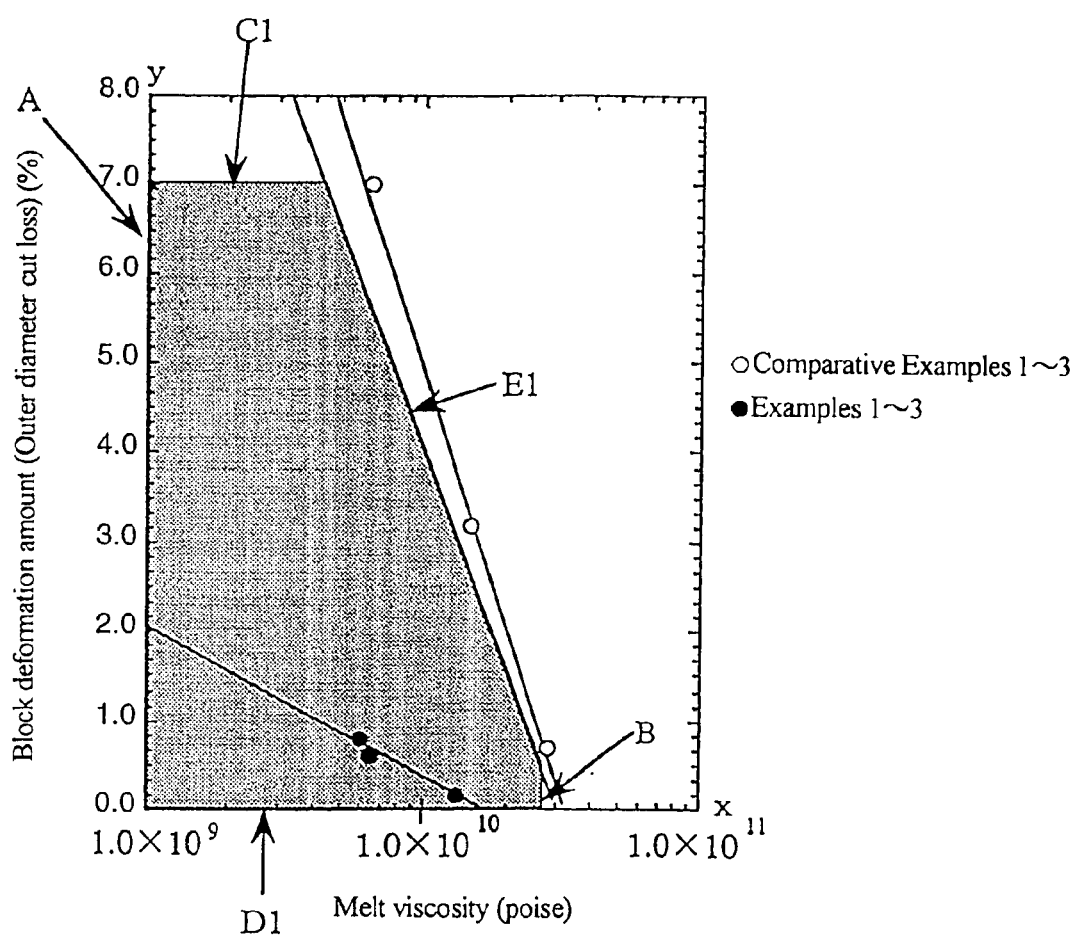
FIG. 4 is a graph showing a block deformation amount (%) and a melt viscosity (poise) at 380° C. to which the polytetrafluoroethylene molded article of the present invention corresponds.

FIG. 4 is a graph showing the block deformation amount (%) and the melt viscosity (poise) at 380° C. possessed by the polytetrafluoroethylene block-shaped molded article of the present invention. The range of the present invention is a region surrounded by a straight line A: $x=1.0\times10^9$ (melt viscosity of $1.0\times10^9$ poise), a straight line B: $x=2.5\times10^{10}$ (melt viscosity of $2.5\times10^{10}$ poise), a straight line C1: $y=7.0$ (block deformation amount of 7.0%), a straight line D1: $y=0$ (block deformation amount of 0%), and a straight line E1: $y=-8.7\ \text{Log}_{10}(x)+91$. The straight line E1 is a straight line showing a state in which the block deformation amount is reduced by about 20% as compared with the prior art (i.e. Comparative Examples 1 to 3). FIG. 4 also shows the data obtained in Examples 1 to 3 and Comparative Examples 1 to 3.

Figure 5:
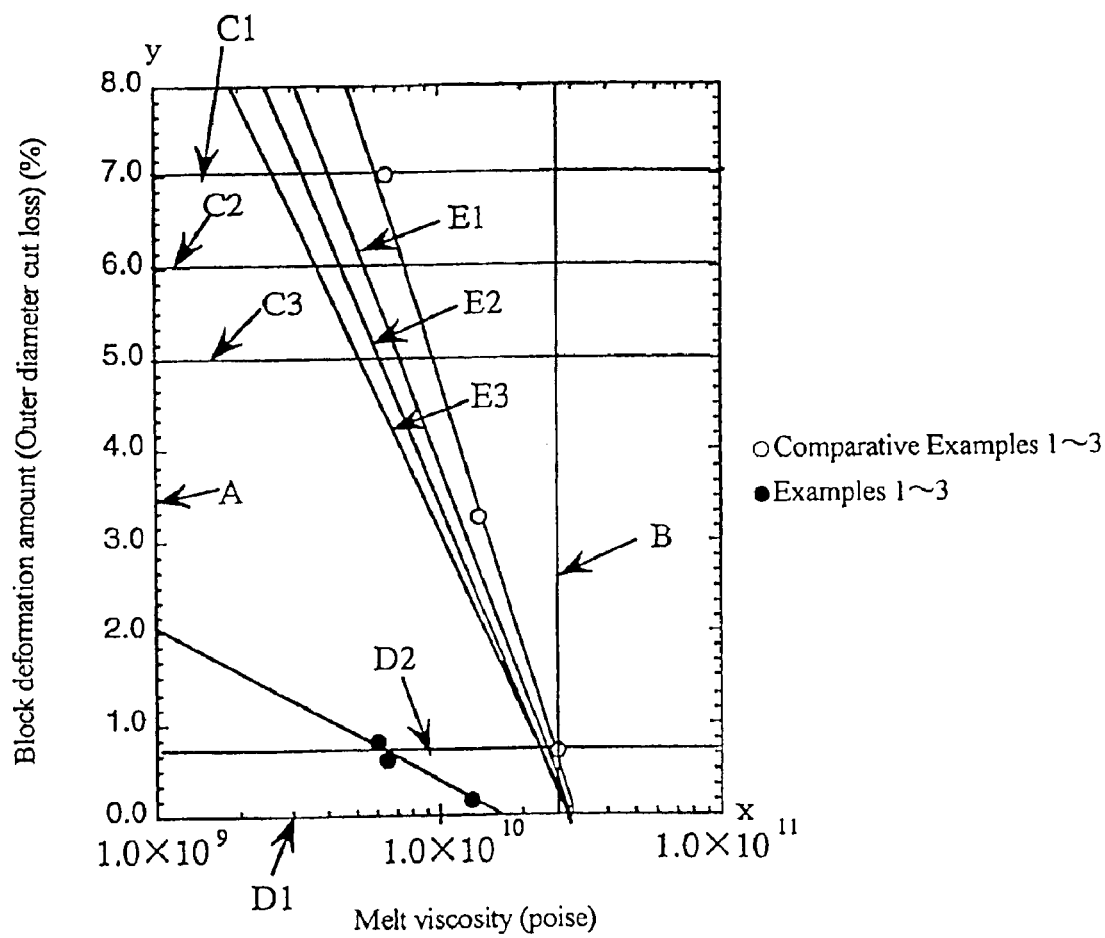
FIG. 5 is a graph showing straight lines that give preferable ranges of the present invention of the block deformation amount (%) and the melt viscosity (poise) at 380° C.

FIG. 5 is a graph showing straight lines which give preferable regions of the present invention of the block deformation amount and the melt viscosity at 380° C. C2 is a straight line with $y=6.0$, and C3 is a straight line with $y=5.0$. E2 is a straight line with $y=-7.6\ \text{Log}_{10}(x)+79$, and E3 is a straight line with $y=-6.5\ \text{Log}_{10}(x)+68$. The straight line E2 is a straight line showing a state in which the block deformation amount is reduced by about 30% as compared with Comparative Examples 1 to 3. The straight line E3 is a straight line showing a state in which the block deformation amount is reduced by about 40% as compared with Comparative Examples 1 to 3. The straight line D2 is a straight line with $y=0.7$ (block deformation amount of 0.7%). In the present invention, the deformation amount may be more than 0.7%.

The baked block-shaped molded article of the present invention has a block deformation amount and a melt viscosity within a region surrounded by the straight line A, straight line B, straight line C1, straight line D1, and straight line E1. The region surrounded by the straight line A, straight line B, straight line C2, straight line D1, and straight line E2 is preferable. The region surrounded by the straight line A, straight line B, straight line C3, straight line D1, and straight line E3 is more preferable.

Preferred Embodiments of the Invention

Hereafter, Examples and Comparative Examples will be shown to exemplify the present invention.

The melt viscosity of tetrafluoroethylene polymer was measured at 380° C. with the use of a viscoelasticity measuring apparatus RDS-2 manufactured by Rheometrics Inc.

EXAMPLE 1

A powder (average particle size: about 30 μm) of tetrafluoroethylene/perfluoropropyl vinyl ether copolymer (melt viscosity at 380° C. of the copolymer: $6.00\times10^9$ poise) obtained by suspension polymerization was compression-molded at 25° C. under a pressure of 200 kg/cm² for 120 minutes to give a preform as shown in FIG. 1. The preform had a length L of about 100 cm, and a diameter D of about 42 cm. The diameter of a hole was about 15 cm. The load per unit area at the time of baking the preform [(weight of the preform (250 kg))÷(outer surface area of the preform excluding the two bottom surface areas (i.e. the area of the surface of the preform brought into contact with the pipe at the baking time) (13,190 cm$^2$)] was 19 g/cm$^2$.

The preform was baked in the manner shown in FIG. 2. The outer diameter of the cross-section of the two rolls was 15 cm. With respect to the stainless steel pipe outside of the molded article, the outer diameter was 50 cm, and the thickness was 1 cm. With respect to the stainless steel pipe inside of the molded article, the outer diameter was 12 cm, and the thickness was 1 cm. The rotation speed of the rolls was adjusted so that the rotation speed of the preform was 90 revolutions per hour. The baking was carried out, while rotating the preform at 90 revolutions per hour and keeping the preform at a temperature of 340 to 380° C. for 50 hours. The baking gave a block-shaped molded article. The block-shaped molded article had a length of about 108 cm, a diameter of about 40 cm, and a diameter of the hole of about 14 cm.

The weight loss (block deformation amount) until a stable film or sheet could be cut from the block-shaped molded article was 0.8%.

The block-shaped molded article was skived to give a film having a thickness of 25 μm. The film had no distortion, and no curls or wrinkles were generated.

EXAMPLE 2

The same procedure as in Example 1 was repeated except that a tetrafluoroethylene-based polymer having a melt viscosity at 380° C. of 6.55×10$^9$ poise was used.

The weight loss (block deformation amount) until a stable film or sheet could be cut from the block-shaped molded article was 0.6%.

The block-shaped molded article was skived to give a film having a thickness of 25 μm. The film had no distortion, and no curls or wrinkles were generated.

EXAMPLE 3

The same procedure as in Example 1 was repeated except that a tetrafluoroethylene-based polymer having a melt viscosity at 380° C. of 1.32×10$^{10}$ poise was used.

The weight loss (block deformation amount) until a stable film or sheet could be cut from the block-shaped molded article was 0.16%.

The block-shaped molded article was skived to give a film having a thickness of 25 μm. The film had no distortion, and no curls or wrinkles were generated.

Comparative Example 1

The same procedure as in Example 1 was repeated except that baking (longitudinal baking) was carried out by means of a conventional method using a tetrafluoroethylene-based polymer having a melt viscosity at 380° C. of 6.55×10$^9$ poise. Namely, the preform was put into a furnace so that the rotation symmetry axis of the preform was in the gravitational direction, and the preform was heated at 340 to 380° C. for 50 hours without moving the preform.

The load per unit area at the time of baking the preform ((weight of the preform (250 kg))÷(bottom surface area ofthe preform 1210 cm$^2$)) was 207 g/cm$^2$.

The weight loss (block deformation amount) until a stable film or sheet could be cut from the block-shaped molded article was 7.0%.

Comparative Example 2

The same procedure as in Example 1 was repeated except that baking (longitudinal baking) was carried out by means of a conventional method using a tetrafluoroethylene-based polymer having a melt viscosity at 380° C. of 1.32×10$^{10}$ poise. Namely, the preform was put into a furnace so that the rotation symmetry axis of the preform was in the gravitational direction, and the preform was heated at 340 to 380° C. for 50 hours without moving the preform.

The weight loss (block deformation amount) until a stable film or sheet could be cut from the block-shaped molded article was 3.2%.

Comparative Example 3

The same procedure as in Example 1 was repeated except that baking (longitudinal baking) was carried out by means of a conventional method using a tetrafluoroethylene-based polymer having a melt viscosity at 380° C. of 2.50×10$^{10}$ poise. Namely, the preform was put into a furnace so that the rotation symmetry axis of the preform was in the gravitational direction, and the preform was heated at 340 to 380° C. for 50 hours without moving the preform.

The weight loss (block deformation amount) until a stable film or sheet could be cut from the block-shaped molded article was 0.7%.

EFFECTS OF THE INVENTION

According to the present invention, a material loss until a stable film or sheet can be cut from a block-shaped molded article is little.

What is claimed is:

1. A polytetrafluoroethylene block-shaped molded article having a melt viscosity and a block deformation amount contained within a polygonal region surrounded by a straight line A: x=1.0×10$^9$ (melt viscosity of 1.0×10$^9$ poise), a straight line B: x=2.5×10$^{10}$ (melt viscosity of 2.5×10$^{10}$ poise), a straight line C1: y=7.0 (block deformation amount of 7.0%), a straight line D1: y=0 (block deformation amount of 0%), a straight line E1: y=−8.7 Log$_{10}$(x)+91 in a graph with an x-axis being a common logarithm of the melt viscosity (poise) at 380° C. of polytetrafluoroethylene and a y-axis being the block deformation amount (%) which is a weight loss until a stable film or sheet is cut from the molded article, wherein the polytetrafluoroethylene block-shaped molded article is obtained by compression-molding and baking a polytetrafluoroethylene powder obtained by suspension polymerization, and said polytetrafluoroethylene block-shaped molded article is cylindrical and has a height of at least 800 mm.

2. The molded article according to claim 1, wherein the melt viscosity at 380° C. of the molded article is at most 2×10$^{10}$ poise.

3. The molded article according to claim 1, wherein the block deformation amount is more than 0.7%.

4. The polytetrafluoroethylene block-shaped molded article of claim 1, wherein the polytetrafluoroethylene powder in said polytetrafluoroethylene block-shaped molded article is a copolymer of tetrafluoroethylene and another fluoromonomer.

5. The polytetrafluoroethylene block-shaped molded article of claim 1, wherein the polytetrafluoroethylene powder in said polytetrafluoroethylene block-shaped molded article is a copolymer of tetrafluoroethylene and another perfluorovinylether of the formula (I):

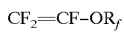

$$CF_2=CF-OR_f \quad (I)$$

wherein $R_f$ is
 a perfluoroalkyl group having 1 to 10 carbon atoms,
 a perfluoro(alkoxyalkyl) group having 4 to 9 carbon atoms,
 a group represented by the formula (II):

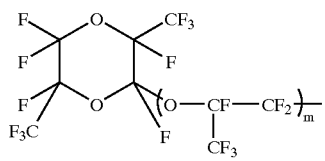

wherein m is a number of 0 to 4, or
a group represented by the formula (III):

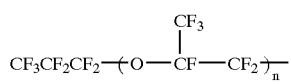

wherein n is a number of 1 to 4.

6. The polytetrafluoroethylene block-shaped molded article of claim 1, wherein the polytetrafluoroethylene block-shaped molded article has a roundness degree of not more than 5.0%.

7. The polytetrafluoroethylene block-shaped molded article of claim 1, wherein the polytetrafluoroethylene block-shaped molded article has a roundness degree of not more than 0.3%.

8. The polytetrafluoroethylene block-shaped molded article of claim 1, wherein the polytetrafluoroethylene block-shaped molded article has a deformation degree of not more than 15%.

9. The polytetrafluoroethylene block-shaped molded article of claim 1, wherein the polytetrafluoroethylene block-shaped molded article has a deformation degree of not more than 1.0%.

10. The polytetrafluoroethylene block-shaped molded article of claim 1, wherein the polytetrafluoroethylene block-shaped molded article has a bend of not more than 2.0%.

11. The polytetrafluoroethylene block-shaped molded article of claim 1, wherein the polytetrafluoroethylene block-shaped molded article has a bend of not more than 0.1%.

12. The polytetrafluoroethylene block-shaped molded article of claim 1, wherein the height of said polytetrafluoroethylene block-shaped molded article is 20 cm to 150 cm.

13. A polytetrafluoroethylene block-shaped molded article, said molded article is produced by a method comprising:

inserting a polytetrafluoroethylene preform obtained by compression-molding a polytetrafluoroethylene powder, into a pipe in a state in which a symmetry axis of the preform is horizontal; placing the pipe on two rolls spaced apart in a horizontal direction; and heating the preform to bake the preform while rotating the pipe and the preform by rotating at least one roll to transmit a rotation of the roll to the pipe, wherein the polytetrafluoroethylene block-shaped molded article is produced, said molded article is cylindrical, has a height of at least 800 mm, and has a melt viscosity and a block deformation amount contained within a polygonal region surrounded by a straight line A: $x=1.0\times10^9$ (melt viscosity of $1.0\times10^9$ poise), a straight line B: $x=2.5\times10^{10}$ (melt viscosity of $2.5\times10^{10}$ poise), a straight line C1: y=7.0 (block deformation amount of 7.0%), a straight line D1: y=0 (block deformation amount of 0%), and a straight line E1: $y=-8.7\ \mathrm{Log}_{10}(x)+91$ in a graph with an x-axis being a common logarithm of the melt viscosity (poise) at 380° C. of polytetrafluoroethylene and a y-axis being the block deformation amount (%) which is a weight loss until a stable film or sheet can be cut from the molded article.

* * * * *